US007291416B2

(12) United States Patent
Margiott et al.

(10) Patent No.: US 7,291,416 B2
(45) Date of Patent: Nov. 6, 2007

(54) FUEL CELL SYSTEM HAVING INLET FUEL TO MORE THAN ONE AND/OR RECYCLE TO LESS THAN ALL OF THE FUEL FIELDS

(75) Inventors: Paul R. Margiott, South Windsor, CT (US); Michael L. Perry, South Glastonbury, CT (US); Carl A. Reiser, Stonington, CT (US); Michael L. Vukovinsky, Old Saybrook, CT (US)

(73) Assignee: UTC Power Corporation, South Windsor, CT (US)

( * ) Notice: Subject to any disclaimer, the term of this patent is extended or adjusted under 35 U.S.C. 154(b) by 519 days.

(21) Appl. No.: 10/765,735

(22) Filed: Jan. 27, 2004

(65) Prior Publication Data

US 2005/0164069 A1    Jul. 28, 2005

(51) Int. Cl.
*H01M 8/24* (2006.01)
(52) U.S. Cl. .......................................... 429/38; 429/39
(58) Field of Classification Search .................. 429/34, 429/38, 39
See application file for complete search history.

(56) References Cited

U.S. PATENT DOCUMENTS 6,572,995 B2 *   6/2003   Yang et al. ............... 429/34 X 7,067,209 B2 *   6/2006   Breault ..................... 429/38 X

FOREIGN PATENT DOCUMENTS

JP    60-039773    *   3/1985
JP    06-188009    *   7/1994

OTHER PUBLICATIONS

U.S. Appl. No. 10/285,236, filed Oct. 31, 2002.

* cited by examiner

*Primary Examiner*—Stephen J. Kalafut
(74) *Attorney, Agent, or Firm*—M. P. Williams (57) ABSTRACT

Fuel cell power plants (19, 47, 60, 86, 102, 112, 121) include recycle fuel from a fuel exit (29) of the last fuel flow field (23, 52, 64, 89) of a series of flow fields (20-23; 49-52; 61-64; 87-89) labeled M–N through M, applied either to the Mth flow fields or both the Mth and the (M–1)th flow fields. The fuel recycle impeller is a blower (30), an ejector (30*b*) or an electrochemical hydrogen pump (30*c*). Fuel from a source (77) may be applied both to the first fuel flow field (87) and an additional fuel flow field (88, 74, 75, 89) of a series of flow fields to reduce pressure drop and flow rate requirements in the first of the series of flow fields and assure more fuel in the additional fuel flow field. Flow to the additional fuel flow field may be controlled by voltage (126) in such field or fuel content (128) of its exhaust. Transient fuel volume is provided by a tank (125).

9 Claims, 7 Drawing Sheets

FUEL CELL SYSTEM HAVING INLET FUEL TO MORE THAN ONE AND/OR RECYCLE TO LESS THAN ALL OF THE FUEL FIELDS

TECHNICAL FIELD

This invention relates to a fuel cell power plant in which: fuel exhausting from the fuel cell power plant is returned by a fuel recycle loop to some, but less than all, of the fuel flow fields within the fuel cell power plant; fuel is fed to at least two flow fields; and recycle fuel is impelled by a blower, an electrochemical hydrogen pump, or an ejector (eductor).

BACKGROUND ART

In order to achieve very high fuel utilization in a proton exchange membrane fuel cell power plant, such as on the order of 99%, while avoiding fuel starvation in any part of the fuel cell power plant, a fuel recycle loop is commonly employed. Such a recycle loop receives the fuel exhaust from the fuel cell power plant, and returns it to the fuel inlet of the fuel cell power plant, utilizing a pump of some sort to restore the pressure of the recycled fuel to a pressure substantially the same as the pressure of the fresh, inlet fuel. The use of a fuel recycle loop allows the fuel utilization in the overall system to be higher than the fuel utilization in the individual fuel cells.

Recycling fuel requires a blower or compressor which adds costs and consumes parasitic power. In the case of pure hydrogen systems, in contrast with reformate, the fuel is difficult to pump due to the low density of hydrogen.

Alternatively, high fuel utilizations may be achieved by passing the fuel serially, first through one set of fuel flow fields, and then through a next set of fuel flow fields in turn, either within each individual fuel cell or through different groups of fuel cells in a fuel cell stack, which is referred to as a "cascaded" fuel cell system. Such systems can achieve overall system fuel utilization on the order of 99% without using a fuel recycle loop, but such systems present other problems. These problems include a high pressure drop across the fuel flow fields; a risk of local fuel starvation, especially in the last of the fuel flow fields, since the hydrogen is diluted by inert gases such as nitrogen that migrates through the electrolyte; and difficulty in startup or shut down of the fuel cell system because of the problem of introducing fuel rapidly throughout the system, particularly on startup.

The startup problem has been partially solved by introducing the fuel into all of the fuel flow fields directly from the fuel supply pipe and extracting the fuel from all of the fuel flow fields directly into the exhaust, as disclosed in U.S. Pat. No. 6,821,668.

DISCLOSURE OF INVENTION

Objects of the invention include: improved fuel utilization in fuel cell power plants; lower fuel pressure drop across the fuel flow fields of fuel cell power plants; improved fuel utilization in serial fuel cell fuel flow fields; reduced pressure fuel recycle in fuel cell power plants; and improved fuel handling and utilization in fuel cell power plants.

According to the present invention, fuel is flowed through fuel flow fields, arranged seriatim, so that fuel exiting one fuel flow field enters another fuel flow field subsequent thereto in a series, there being fuel recycle from the fuel exhaust of said fuel cell power plant that returns recycle fuel to either or both of the last two of said fuel flow fields in said series.

The series of fuel flow fields may be various passes within the fuel flow channels of individual fuel cells; or they may be groups of fuel cells arranged in series within a single, cascaded stack; or they may be the fuel cells of individual fuel cell stacks having a series fuel flow relationship, such that the fuel exiting any stack but the last enters the next subsequent stack in the series. Multiple fuel passes may be achieved with internal fuel manifolds, external fuel manifolds or both internal and external fuel manifolds.

According further to the invention, to provide a lower fuel velocity through a first fuel flow field of a fuel cell power plant that feeds the fuel to a next fuel flow field in a series of fuel flow fields, some of the inlet fuel is bypassed around the first flow field in the series and applied directly to the fuel inlet of an additional fuel flow field in the series. Bypassing a portion of the fuel around the first flow field is beneficial because it reduces the pressure drop through the first flow field as a result of the reduced flow. The reduced flow also results in less dryout of the electrolyte at the entrance to the first flow field. This is particularly important in extending the life of the electrolyte where the electrolyte is a proton exchange membrane. In one example, two fuel cell stacks are connected in series, the second stack in the series receiving fuel both from the first stack in the series and from the fuel supply pipe. In another example, both the first and second stages of a cascaded fuel cell stack receive fuel from the fuel supply pipe. Another example of this aspect of the invention provides fuel from a source directly to the last flow field in the series.

In accordance with the invention, flow of fuel into the additional flow field is controlled by at least one of (a) a voltage in said flow field and (b) fuel exiting therefrom.

According still further to the invention, a fuel cell power plant uses an ejector or eductor to draw fuel into the fuel inlet of a flow field of said fuel cell stack from the exhaust of said fuel cell stack.

According to the invention further, the fuel exhaust of a fuel cell stack is impelled by a simple blower to the inlet of a fuel flow field of said fuel cell stack to provide recycle fuel.

According to the invention further, the fuel exhaust of a fuel cell stack is impelled by an electrochemical hydrogen pump to the inlet of a fuel flow field of said fuel cell stack to provide recycle fuel.

In accordance with another aspect of the invention, a low pressure volume of fuel may be provided to fuel flow fields other than the first fuel flow field, thereby to permit additional hydrogen to flow into the downstream fuel flow fields when there is a rapid increase in the load on the fuel cell stack.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
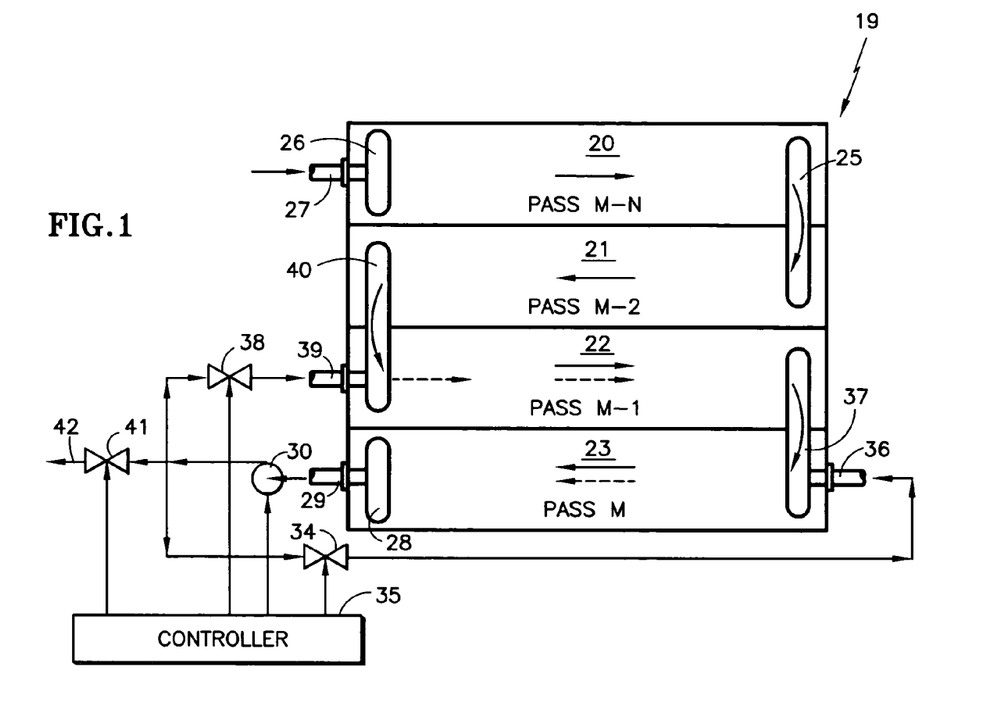
FIG. 1 is a simplified, stylized, schematic illustration of a fuel cell power plant according to the invention having a plurality of passes within all of the fuel cells of the fuel cell stack, with recycle fuel applied to the last two passes.

Referring to FIG. 1, a fuel cell power plant 19 comprises a plurality of fuel cells (only one is shown), each having fuel flow channels arranged in a series of M fuel flow fields 20-23 which comprise pass M–N through pass M, the fuel flow channels of each pass 20-22 except the last pass 23 being fed to the next pass 21-23 in the series. The transition 25 between flow field 20 and flow field 21 is an internal turn manifold. Fuel is received at an internal fuel inlet manifold 26 from a fuel supply pipe 27, and the exhaust of the fuel cell stack 19 passes through an internal fuel exit manifold 28 and pipe 29 to a fuel recycle impeller 30. The output of the fuel recycle impeller 30 is fed through a first valve 34 in response to a controller 35 to a bypass inlet pipe 36 and internal manifold 37 to the last pass 23 of the fuel cell stack, as well as through a valve 38 and a bypass inlet pipe 39 and internal manifold 40 to the –1 pass 22 of the fuel cell stack. Some portion of the exhaust is passed through a valve 41 to an exhaust pipe 42. In the embodiment of FIG. 1, the fuel is passed from the fuel inlet to the fuel exhaust through channels within each fuel cell, the turn from one pass to the next being provided by internal turn manifolds formed within each cell.

Figure 2:
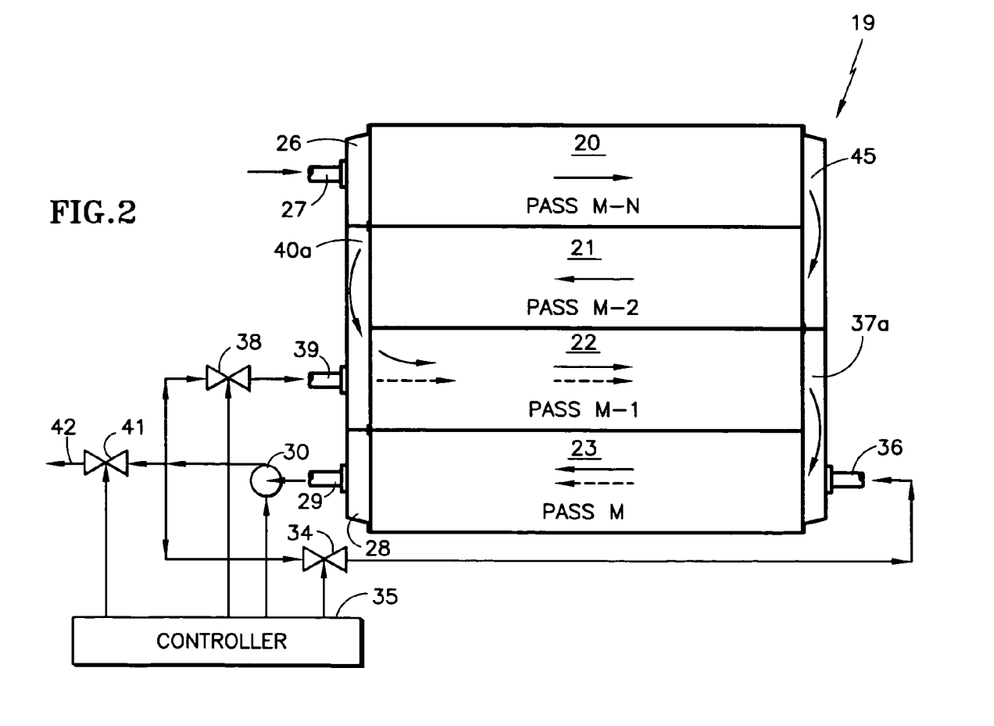
FIG. 2 is a simplified, stylized, schematic illustration of the fuel cell power plant of FIG. 1 employing only external fuel manifolds.

FIG. 2 illustrates the fuel cell power plant 19 of FIG. 1 in which, however, all of the transfer of fuel from one pass to the next is accomplished by external turn manifolds 45, 40a, 37a. If desired, the transfer from one pass to the next may be achieved with internal turn manifolds, where appropriate, so long as there is provision for the inlet of bypass fuel.

In the configurations of FIGS. 1 and 2, there are four passes, but there may be two or three, or more than four. In the configurations of FIGS. 1 and 2, recycle fuel is provided to both the last pass in the fuel cell stack and the next to last pass in the fuel cell stack. However, according to the invention, recycle fuel need only be provided to either the last pass 23 of the fuel cell stack, or to the next-to-last pass 22 of the fuel cell stack, and need not be provided to both.

Figure 3:
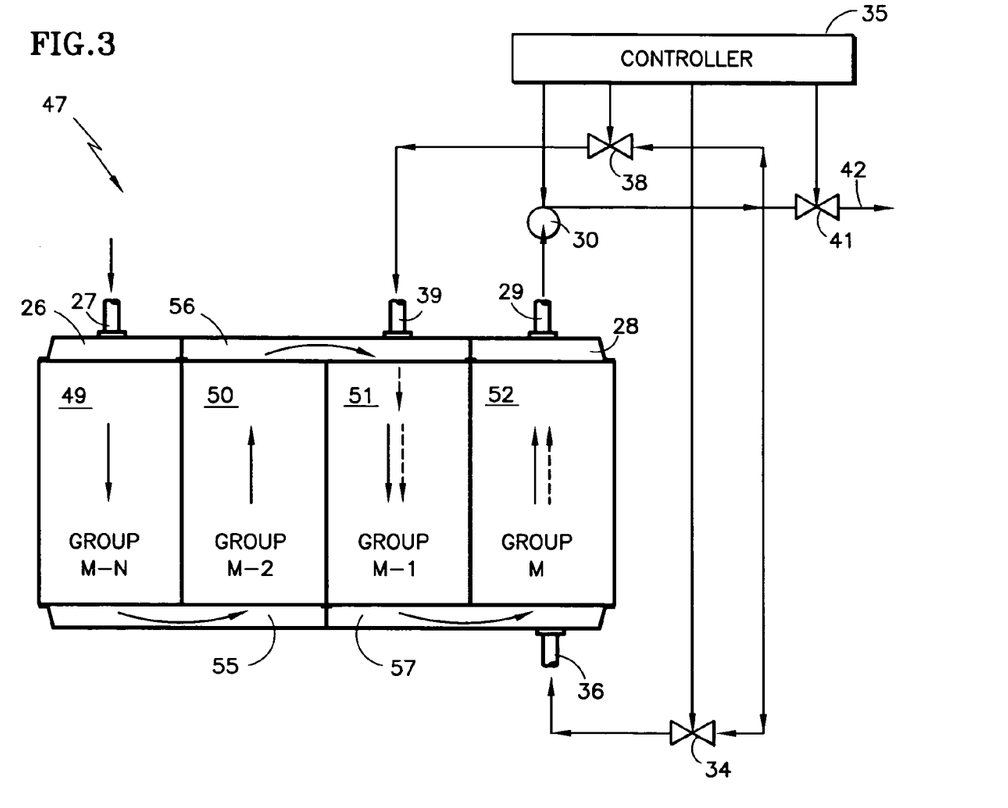
FIG. 3 is a simplified, stylized, schematic illustration of a fuel cell power plant according to the invention having a plurality of groups of fuel cells arranged in serial fuel flow relationship in a cascaded fuel cell stack, having recycled fuel applied to the last two groups of the stack.

Referring to FIG. 3, a cascaded fuel cell power stack 47 comprises a series of substacks of fuel cells 49-52 arranged in a series M–N through M, the fuel outlet of each substack 49-51 except the last substack 52 being fed to the next substack in said series 50-52. Within each substack, there are a number of fuel cells, the fuel cells of the cascaded stack 47 being connected electrically in series with each other. In the cascaded stack 47, the fuel is passed from the first substack 49 to the second substack 50 by a turn manifold 55; the fuel is passed from the second substack to the third substack by a turn manifold 56; and the fuel is passed from the third substack to the fourth substack by a turn manifold 57. The turn manifolds 56 and 57 have the bypass fuel inlets 36,39 providing bypass fuel to the last two flow fields.

In the configuration of FIG. 3, the cascaded fuel cell stack 47 includes four substacks; however, according to the invention, there may be two substacks, three substacks, or more than four substacks. In the cascaded fuel cell stack 47, recycle fuel is provided to the last two substacks 51, 52. However, it may be provided only to the last substack 52, in accordance with the invention; in such a case, the turn manifold 56 would not have a fuel inlet 39.

Figure 4:
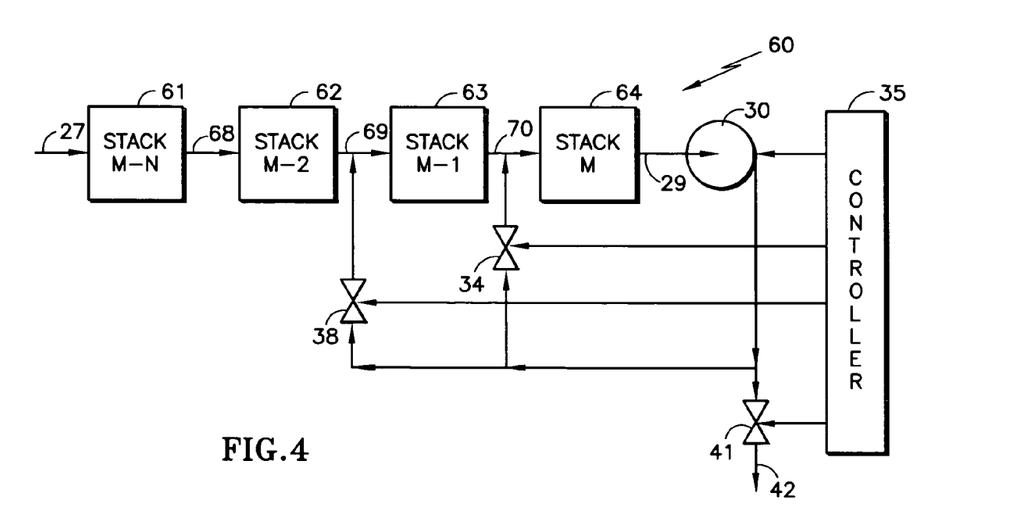
FIG. 4 is a simplified, stylized, schematic illustration of a fuel cell power plant according to the invention having a plurality of fuel cell stacks arranged in series, with recycled fuel applied to the last two stacks in the series.

Referring to FIG. 4, a fuel cell power plant 60 includes a plurality of complete fuel cell stacks 61-64, labeled M–N through M. The first stack 61 receives fuel from a fuel supply pipe 27, the second stack 62 in said series receives fuel over a conduit 68 from the first fuel cell stack 61 in said series; the third fuel cell stack 63 receives fuel in a conduit 69 both from said second fuel cell stack 62 and from the valve 38, which comprises recycle fuel provided by the impeller 30, which is connected by the outlet 29 to a fuel exit manifold interconnected with the fuel flow field exits of the last stack 64 in said series. The last stack 64 in said series receives fuel over a conduit 70 both from the next to last stack 63 in said series and from the valve 34 which receives bypass fuel from the impeller 30.

The fuel cell power plant 60 includes four fuel cell stacks 61-64, but it may include two fuel cell stacks, three fuel cell stacks or more than four fuel cell stacks. The fuel cell power plant 60 provides bypass fuel to both the last stack 64 in the series and the next to last stack 63 in the series; however, in accordance with the invention, bypass fuel may be provided only to the next-to-last stack 63 in the series or only to the last stack 64 in the series, in which case one of the valves 34, 38 and conduits related thereto would be omitted.

Figure 5:
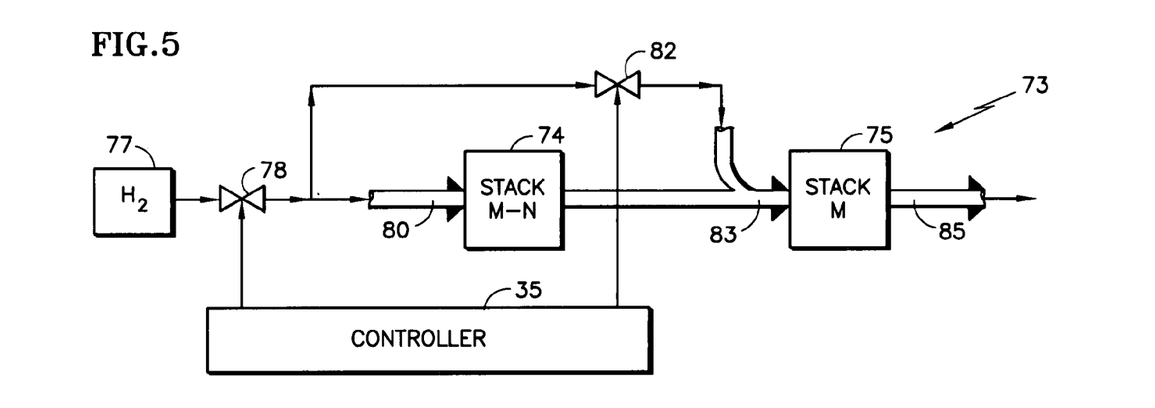
FIG. 5 is a simplified, stylized, schematic illustration of a fuel cell power plant according to the invention having a pair of fuel cell stacks, the second fuel cell stack receiving fuel both from the first fuel cell stack and from the fuel supply pipe, in accordance with the invention.

Another aspect of the invention is illustrated in FIG. 5, in which a fuel cell power plant 73 includes two fuel cell stacks 74, 75 labeled M–N through M. Fuel is provided from a source 77 through a valve 78, under control of the controller 35, to an inlet 80 of a fuel inlet manifold of the stack 74. Fuel is also provided from the valve 78 through a valve 82 (which may be replaced by an orifice) to the inlet 83 of the fuel inlet manifold of the second stack 75 in the series, the inlet 83 also receiving fuel from the fuel exit manifold of the stack 74. This provides some of the fuel to the stack 75 without having to flow that fuel through the stack 74, which reduces fuel velocity and the pressure drop in the fuel flow field of the stack 74 and also assists in avoiding fuel starvation in portions of the stack 75, in accordance with this aspect of the invention.

Figure 6:
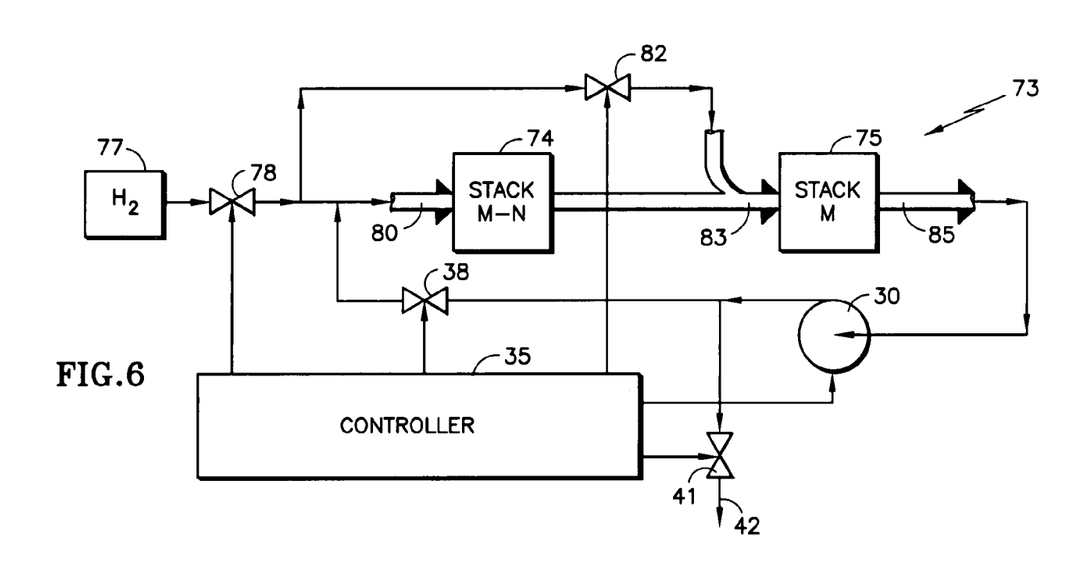
FIG. 6 is a simplified, stylized, schematic illustration of the fuel cell power plant of FIG. 5, having recycled fuel provided to the inlet of the first stack.

As illustrated in FIG. 6, the fuel exiting from the fuel exit manifold of the last stack 75 in the series may be provided by a fuel exit conduit 85 to the recycle fuel impeller 30 which will provide recycle fuel through the valve 38, in response to the controller 35, to the inlet 80 of the fuel inlet manifold of the stack 74. Thus, the aspect of the invention illustrated by the fuel cell power plant 73 of FIGS. 5 and 6 may be used with or without recycle fuel being provided to one of the stacks. Although illustrated in FIG. 6 as providing recycle fuel only to the first of the fuel flow fields (the stack 74) in the series of fuel flow fields, the recycled fuel may be provided as well to the second of the fuel flow fields in this series, stack 75, or to both stacks. Although the configurations of FIGS. 5 and 6 are illustrated with only two stacks, three or more stacks may employ the invention, with or without recycle fuel in various configurations, in accordance with the invention.

It is desirable that the fuel feed to valve 82 in FIG. 6 be upstream of the fuel recycle gas feed to stacks M–N. There are two advantages to this location: (1) the hydrogen content of the stream is higher and (2) the stream is free of water which permits more accurate metering of the flow.

Figure 7:
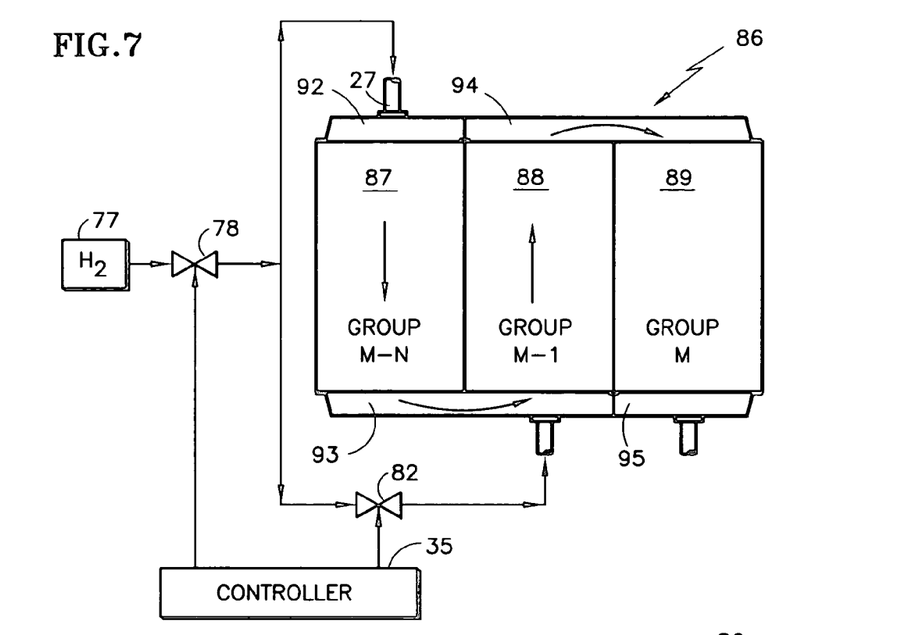
FIG. 7 is a simplified, stylized, schematic illustration of a cascaded fuel cell power plant according to the invention having a plurality of groups of fuel cells, the second group receiving fuel both from the first group and from the fuel supply pipe.

Referring to FIG. 7, a cascaded fuel cell power plant 86 has a series of groups of fuel cells 87-89 labeled M–N through M. The cascaded power plant 86 has a fuel inlet manifold 92, a first fuel turn manifold 93, a second fuel turn manifold 94 and a fuel exit manifold 95. Fuel from the source 77 passes through a valve 78, in response to the controller 35, directly into the fuel inlet manifold 92. Fuel also flows through a valve 82, under control of the controller 35, to the first fuel turn manifold 93. In this way, all of the fuel that has to reach the second group 88 and third group 89 in the cascaded fuel cell power plant 86 does not have to pass through the first group 87. Thus, there is less pressure drop and less dryout of the electrolyte through the first group 87 and the fuel requirements of the second and third stacks 88, 89 can be met with a lower rate of fuel flow.

Figure 8:
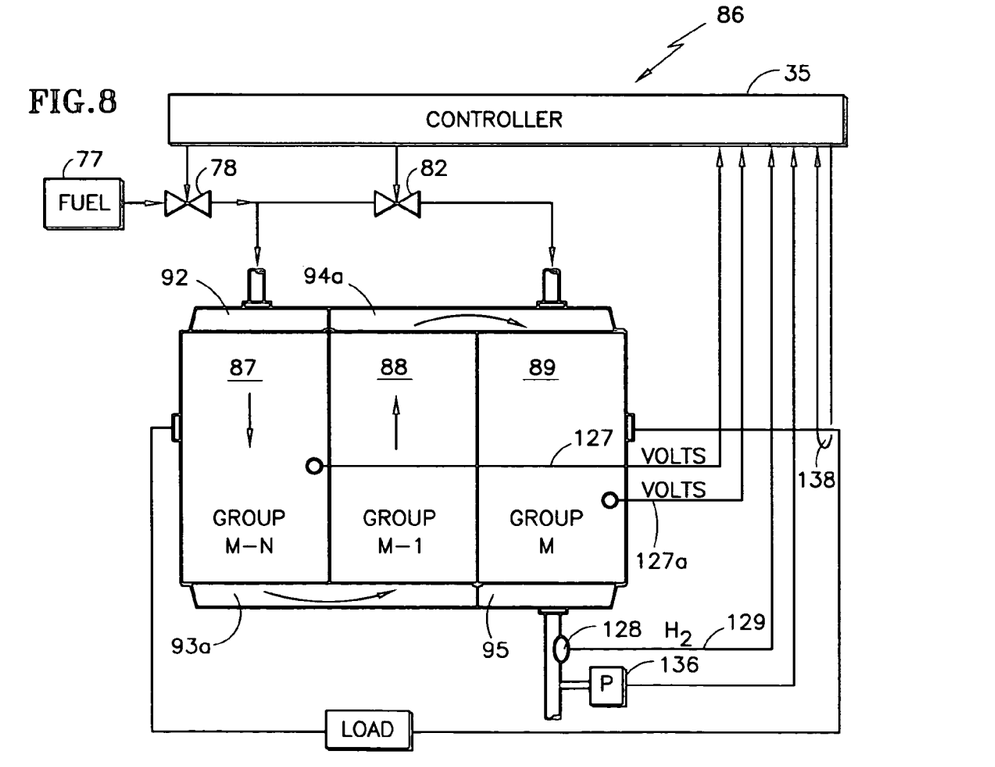
FIG. 8 is a simplified, stylized, schematic illustration of a cascaded fuel cell power plant according to the invention having a plurality of groups of fuel cells, the last group receiving fuel both from the next to last group and from the fuel supply pipe.

In FIG. 8, a fuel cell power plant 86 has fuel from the source 77 passed through the valves 78, 82 to a fuel inlet to a turn manifold 94a so as to provide fuel directly from the source 77 into the Mth group of fuel flow fields 89. In the configuration of FIG. 8, a turn manifold 93a does not have a fuel inlet from the source 77.

In FIG. 8, there is also illustrated the fact that control over the valve 82 may be in response to the voltage 127a within the last group of cells, which can be the voltage across the entire group or a voltage taken across some number of fuel cells. Or, the controller 35 may control the valve 82 in response to a signal from a hydrogen detector 128 on a line 129 indicative of the hydrogen concentration in the flow outlet from the fuel exit manifold 95. Or, both voltage and hydrogen content may be utilized to control the valve 82. In this manner, if the average cell voltage within the last group of cells on line 127a was lower than the average cell voltage across the stack on line 127, hydrogen starvation would be indicated and the valve 82 will be opened, or opened a greater amount. Similarly, any indication of hydrogen starvation (too small a hydrogen concentration in the exhaust from the fuel exit manifold 95) will cause an increase in the flow volume through the valve 82 by the controller 35. Conversely, the valve 82 could be adjusted towards partial or complete closure if the indication was contrary.

FIG. 8 also illustrates that the controller may respond to pressure indicated by a signal from a pressure transducer 136 as well as current through the load as indicated by a signal from a current sensor 138.

Figure 9:
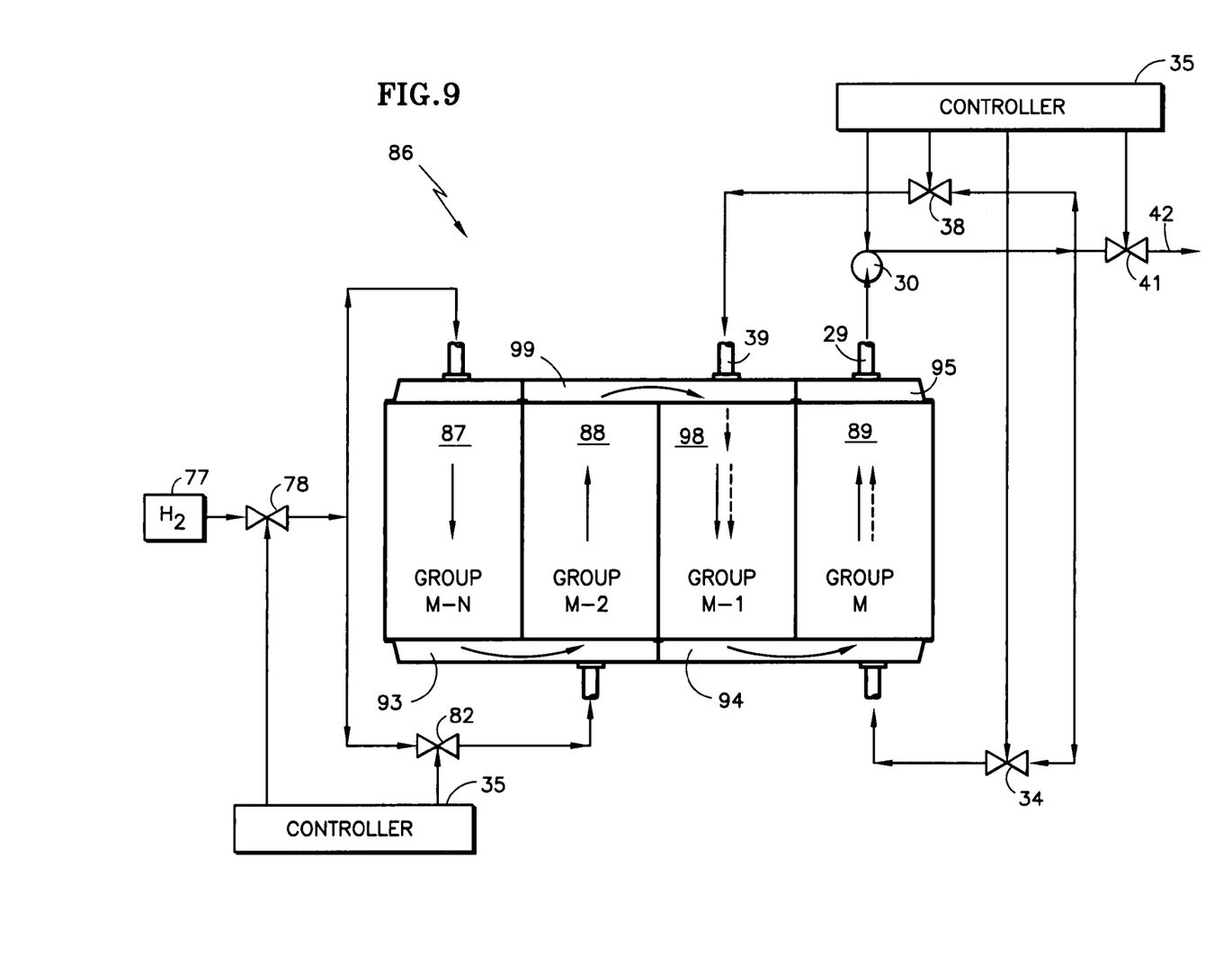
FIG. 9 is a simplified, stylized, schematic illustration of a cascaded fuel cell stack according to the invention in which the second group receives fuel both from the first group and from the fuel supply pipe, and having recycle fuel provided from the exhaust of said fuel cell power plant to the last two groups in the cascade.

Referring to FIG. 9, the cascaded fuel cell stack 86 has another group 98 and an additional fuel turn manifold 99, and includes recycle fuel flow to the two last groups, 98, 89 as described hereinbefore with respect to FIG. 3. Thus, fuel cell power plants may take advantage of both of these aspects of the present invention, including feeding some of the fuel in a cascaded fuel cell stack to a second group (−2) of the stack, thereby to reduce the amount and rate of fuel flow through the first group (M−N) of the cascaded fuel cell stack, as well as having recycle fuel applied either to only the last group (M) in the cascaded fuel cell stack, or recycle fuel applied to the next-to-last (−1) groups of the fuel cell stack, or both.

Figure 10:
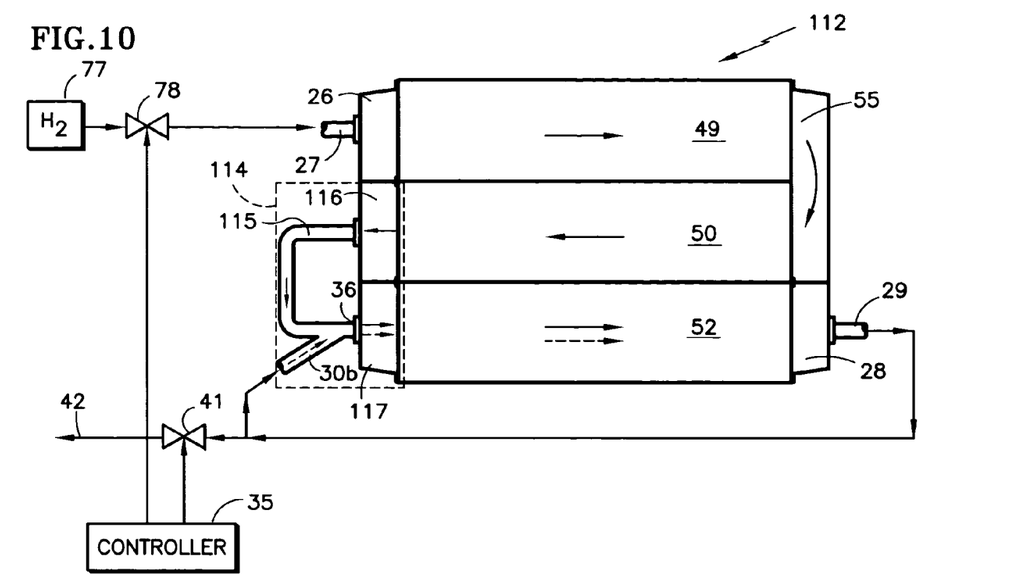
FIG. 10 is a simplified, stylized, schematic illustration of a cascaded fuel cell stack according to the invention having an ejector for drawing recycled fuel from the fuel exhaust of said fuel cell stack to the inlet of the last group of the cascade.

Referring to FIG. 10, a cascaded fuel cell power plant 112 is essentially a three group version of the cascaded fuel cell power plant 47 described with respect to FIG. 3. hereinbefore, except that there are only three groups 49, 50, 52 of fuel cells, and only one recycle inlet 36. In FIG. 10, another aspect of the invention is the low pressure requirement when the recycle fuel is returned only to the last one or two fuel flow fields in a series of fuel flow fields. This permits use of low power, low pressure impellers in a fuel turn manifold 114, such as the ejector 30b, that transmits fuel through a conduit 115 from a fuel turn exit manifold 116 to a fuel turn inlet manifold 117. The ejector 30b is capable of drawing the recycle fuel from the fuel outlet 29, due to the fact that there is only a small pressure drop across a single one of the flow fields 52, in contrast with applying fuel recycle gas to the first flow field (such as 49) in fuel cell power plants known to the art.

Figure 11:
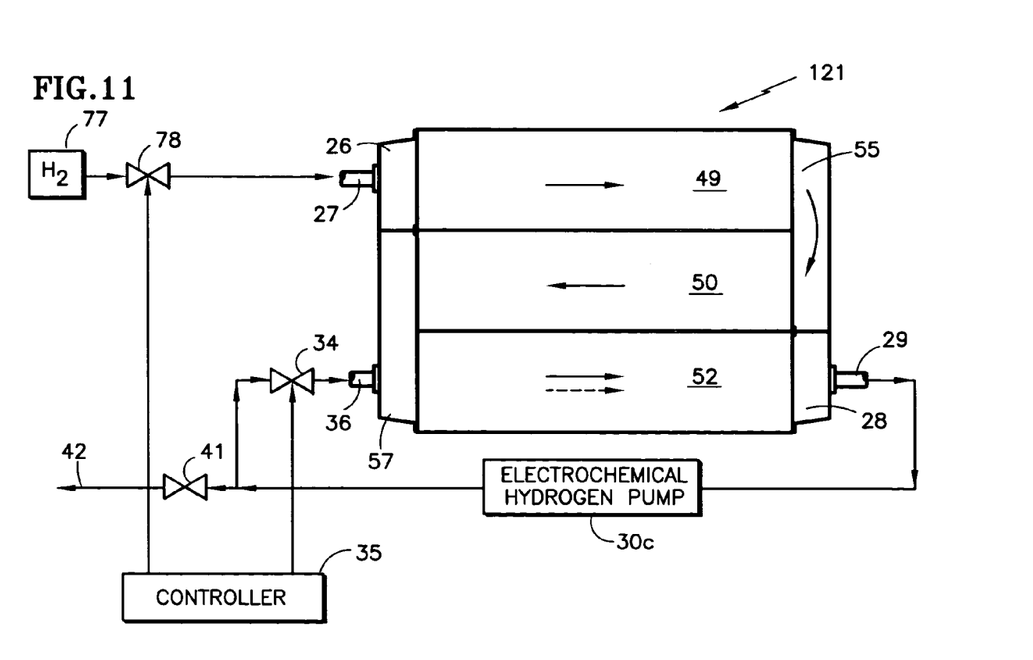
FIG. 11 is a simplified, stylized, schematic illustration of a cascaded fuel cell stack according to the invention having an electrochemical hydrogen pump for drawing recycled fuel from the fuel exhaust of said fuel cell stack to the inlet of the last group of the cascade.

A fuel cell power plant 121 illustrated in FIG. 11 is similar to the fuel cell power plants 102, 112 of FIG. 10 except that the impeller 30c is an electrochemical hydrogen pump as described in U.S. Pat. No. 6,280,865.

Thus, an important aspect of the invention is having low pressure fuel bypass resulting from applying the fuel bypass to either one or two of the last two fuel flow fields in a series of fuel flow fields. The low pressure allows use of devices such as ejectors, electrochemical hydrogen pumps, and simple blowers having low pressure and low energy requirements. This minimizes parasitic power consumption and renders the entire fuel cell power plant more efficient. The invention also assures that the later stages of fuel flow fields arranged in a serial fuel flow relationship will not suffer from fuel starvation, even though fuel utilization of the overall power plant may be on the order of 99%.

Figure 12:
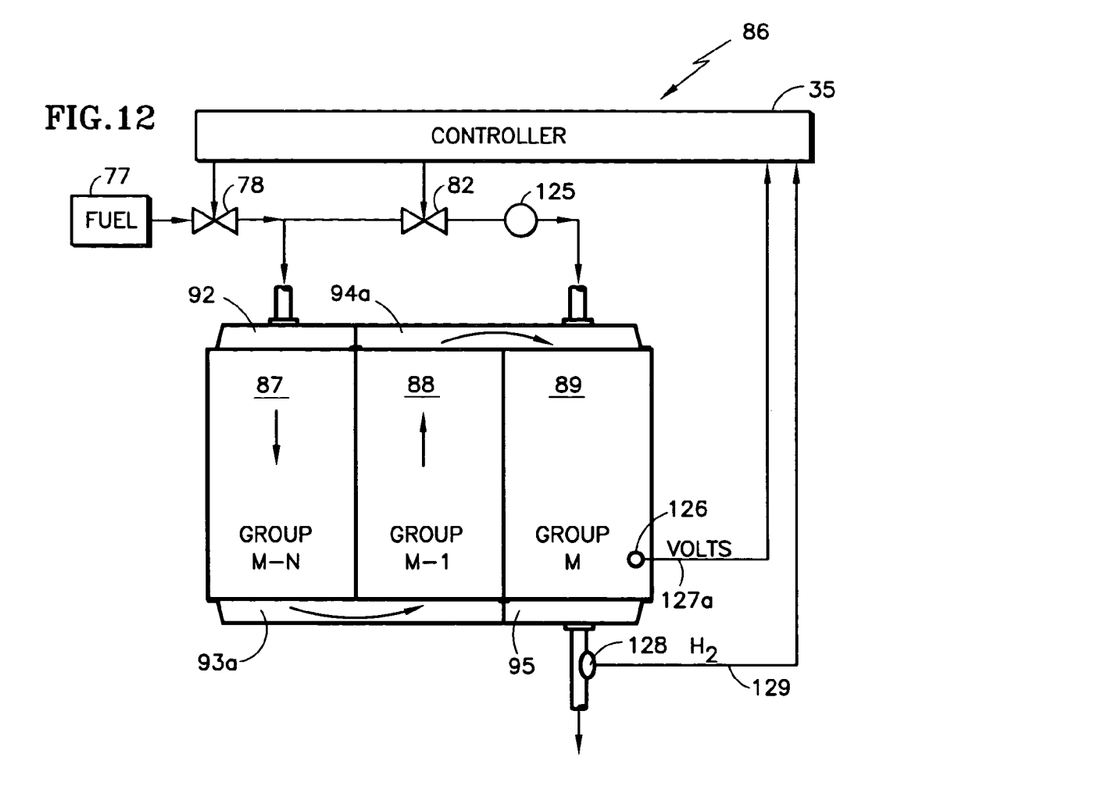
FIG. 12 is a simplified, stylized, schematic illustration of a cascaded fuel cell power plant according to the invention having a plurality of groups of fuel cells, the last group receiving fuel both from the next to last group and from a fuel supply reserve tank.

Another aspect of the invention is illustrated in FIG. 12, in which the fuel cell power plant 86 is similar to that of FIG. 8 except that there is provided a reserve volume of fuel, such as in a low pressure fuel storage tank 125 provided between the valve 82 and the inlet of the manifold 94a. This allows the last group of flow fields 89 to receive, instantly, additional hydrogen when the load of the fuel cell stack rapidly increases. Applying fuel from the source to more than the first flow field in a series of flow fields, as illustrated in FIGS. 5-9, is particularly beneficial when reformate is used as a fuel, rather than pure hydrogen.

In all of the embodiments of FIGS. 5-9 and 12, the valves 78, 82 need not be in series, the valve 82 may be connected directly to the source 77 of hydrogen or other hydrogen-rich fuel, such as reformate. Thus, the additional fuel flow field may receive fuel from the source either directly or through the storage device 125, which adds available fuel volume to assist in increased load transients.

FIG. 12 also illustrates a further aspect of the invention in which the amount of fuel flow to the additional fuel flow fields 89 is controlled either by voltage of the group of fuel flow fields, or some subgroup thereon, as determined by a voltage sensor 126 which provides a signal on the line 127a to the controller 35. Or, the quantity of fuel provided to the additional fuel flow fields 89 may be controlled by the amount of fuel flowing through the additional fuel flow field, such as the fuel exiting the fuel exit manifold 95 as sensed by a hydrogen detector 128 which provides a signal on a line 129 to the controller 35. Or both voltage and hydrogen content may be utilized to control the amount of flow to the additional flow field.

Figure 13:
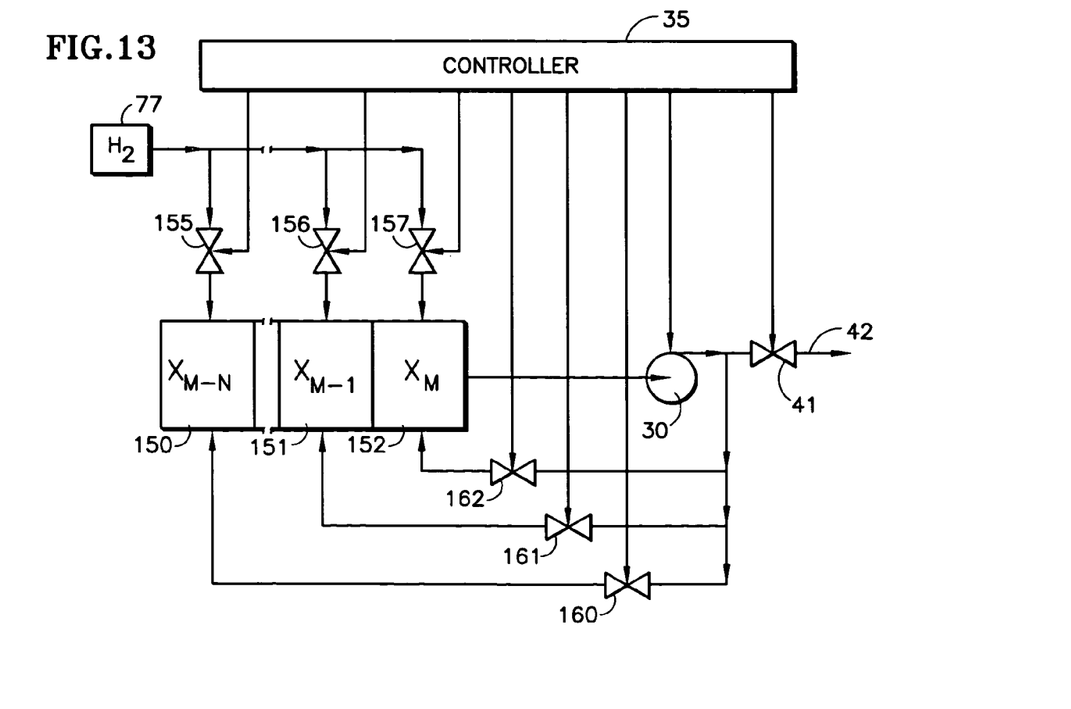
FIG. 13 is a simplified, stylized block illustration of cascaded fuel flow fields any or all of which may receive fresh fuel from a source and/or fuel recycle gas.

FIG. 13 illustrates that any number of fuel flow fields (X) 150 ... 151, 152 may receive fuel directly from the source 77, under control of corresponding valves 155 ... 156, 157 as well as receiving fuel recycle gas from corresponding valves 160, 161, 162. Fuel from the source 77 may be applied to the first two or the first and last or all or however it is desired, and recycle fuel gas may be provided to the last, the next to last, the first, or any combination of the fuel flow fields. In FIG. 13, it is to be understood that the fuel flow fields may be fuel flow passes through the fuel flow channels of each cell, the fuel flow fields of M groups of fuel cells in a serial fuel flow relationship within one cascaded fuel cell stack, or the fuel flow fields of M fuel cell stacks in a serial fuel flow relationship.

Although fuel cell power plants employing several aspects of the present invention may be preferred for the greatest efficiencies, various aspects of the present invention may be utilized independently, if desired in any utilization thereof.

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant for providing electric power to a load, comprising:

a plurality of fuel cells having fuel flow channels arranged in a series of M fuel flow fields, the last fuel flow field in said series being the Mth fuel flow field in said series, and the first fuel flow field in said series being the (M−N)th flow field in said series, where N is one less than M, said series of fuel flow fields selected from (a) M fuel flow passes through the fuel flow channels of each cell, (b) the fuel flow fields of M groups of fuel cells in a serial fuel flow relationship within one cascaded fuel cell stack, in which the fuel is fed from each group but the last into the next group in the series, and (c) the fuel flow fields of M fuel cell stacks in serial fuel flow relationship in which fuel is fed from each stack but the last into the next stack in the series, each of said fuel flow fields connected between a fuel flow field inlet and a fuel flow field exit;

each of said fuel flow field inlets connected to a fuel manifold selected from (d) an internal fuel inlet manifold, (e) an external fuel inlet manifold, (f) an internal fuel turn manifold, and (g) an external fuel turn manifold;

each of said fuel flow field exits connected to a fuel manifold selected from (h) an internal fuel exit manifold, (i) an external fuel exit manifold, (j) an internal fuel turn manifold, and (k) an external fuel turn manifold;

a source of fuel;

said first flow field in said series receiving fuel from said source;

an additional fuel flow field in said series receiving fuel from said flow field next antecedent to said additional fuel flow field in said series and either (l) directly from said source or (m) from said source through a fuel storage device which receives fuel from said source;

a fuel recycle loop receiving fuel from the one of said manifolds connected to the fuel flow field exit of said Mth one of said fuel flow fields and providing recycle fuel to either (r) a first one of said manifolds connected to the fuel flow field inlet of said Mth flow field in said series, or (s) a second one of said manifolds connected to the fuel flow field inlet of the (M−1th) flow field in said series, or (t) both said first end second manifolds; and said fuel recycle loop having an impeller selected from (u) a blower, (v) an electrochemical hydrogen pump, (w) an ejector having its input connected to said fuel flow field exit of said Mth flow field and having its output connected to one or both of said first and second manifolds.

2. A fuel cell power plant, comprising:

a plurality of fuel cells having fuel flow channels arranged in a series of M fuel flow fields, the last fuel flow field in said series being the Mth fuel flow field in said series and the first fuel flow field in said series being the (M−N)th flow field in said series, where N is one less than M, said series of fuel flow fields selected from (a) M fuel flow passes through the fuel flow channels of each cell, (b) the fuel flow fields of M groups of fuel cells in a serial fuel flow relationship within one cascaded fuel cell stack, in which the fuel is fed from each group but the last into the next group in the series, and (c) the fuel flow fields of M fuel cell stacks in serial fuel flow relationship in which fuel is fed from each stack but the last into the next stack in the series, each of said fuel flow fields connected between a fuel flow field inlet and a fuel flow field exit;

each of said fuel flow field inlets connected to a fuel manifold selected from (d) an internal fuel inlet manifold, (e) an external fuel inlet manifold, (f) an internal fuel turn manifold, and (g) an external fuel turn manifold;

each of said fuel flow field exits connected to a fuel manifold selected from (h) an internal fuel exit manifold, (i) an external fuel exit manifold, (j) an internal fuel turn manifold, and (k) an external fuel turn manifold;

a source of fuel;

said first flow field in said series receiving fuel from said source; and a fuel recycle loop receiving fuel from the one of said manifolds connected to the fuel flow field exit of said Mth one of said fuel flow fields and providing recycle fuel to both (l) a first one of said manifolds connected to the fuel flow field inlet of said Mth flow field in said series, and (m) a second one of said manifolds connected to the fuel flow field inlet of the (M−1th) flow field in said series.

3. A fuel cell power plant according to claim 2 wherein:
said fuel recycle loop has an impeller selected from (a) an ejector having its primary input connected to said fuel flow field exit of said (M−1th) flow field, its secondary input connected to said fuel flow field exit of said Mth flow field and having its output connected to one or both said first and second manifolds, (b) a blower, and (c) an electrochemical hydrogen pump.

4. A fuel cell power plant for providing electric power to a load, comprising:
a plurality of fuel cells having fuel flow channels arranged in a series of M fuel flow fields, the last fuel flow field in said series being the Mth fuel flow field in said series, and the first fuel flow field in said series being the (M−N)th flow field in said series, where N is one less than M, said series of fuel flow fields selected from (a) M fuel flow passes through the fuel flow channels of each cell, (b) the fuel flow fields of M groups of fuel cells in a serial fuel flow relationship within one cascaded fuel cell stack, in which the fuel is fed from each group but the last into the next group in the series, and (c) the fuel flow fields of M fuel cell stacks in serial fuel flow relationship in which fuel is fed from each stack but the last into the next stack in the series, each of said fuel flow fields connected between a fuel flow field inlet end a fuel flow field exit;
each of said fuel flow field inlets connected to a fuel manifold selected from (d) an internal fuel inlet manifold, (e) an external fuel inlet manifold, (f) an internal fuel turn manifold, and (g) en external fuel turn manifold;
each of said fuel flow field exits connected to a fuel manifold selected from (h) an internal fuel exit manifold, (i) an external fuel exit manifold, (j) an internal fuel turn manifold, and (k) an external fuel turn manifold;
a source of fuel;
said first flow field in said series receiving fuel from said source; and
the next-to-last fuel flow field in said series receiving fuel both (l) from a fuel flow field next antecedent to said additional fuel flow field in said series and (m) directly from said source.

5. A fuel cell power plant according to claim 4 wherein:
the next to last flow field in said series receiving fuel both from a fuel flow field next antecedent to said next to last fuel flow field in said series and directly from said source, and said last flow field in said series receiving fuel both from said next to last flow field in said series and directly from said source.

6. A fuel cell power plant according to claim 4 wherein:
the fuel flow from said source to said additional flow field is controlled in response to at least one of (n) a voltage generated in the fuel cells of said additional flow field (o) the concentration of fuel flowing through said additional fuel flow field, (p) the current flowing in said load, and (q) pressure of reactant gas flow exiting said additional flow field.

7. A fuel cell power plant, comprising:
a plurality of fuel cells having fuel flow channels arranged in a series of M fuel flow fields, the last fuel flow field in said series being the Mth fuel flow field in said series, and the first fuel flow field in said series being the (M−N)th flow field in said series, where N is one less than M, said series of fuel flaw fields selected from (a) M fuel flow passes through the fuel flow channels of each cell, (b) the fuel flow fields of M groups of fuel cells in a serial fuel flow relationship within one cascaded fuel cell stack, in which the fuel is fed from each group but the last into the next group in the series, and (c) the fuel flow fields of M fuel cell stacks in serial fuel flow relationship in which fuel is fed from each stack but the last into the next stack in the series, each of said fuel flow fields connected between a fuel flow field inlet and a fuel flow field exit;
each of said fuel flow field inlets connected to a fuel manifold selected from (d) an internal fuel inlet manifold, (e) an external fuel inlet manifold, (f) an internal fuel turn manifold, and (g) an external fuel turn manifold;
each of said fuel flow field exits connected to a fuel manifold selected from (h) an internal fuel exit manifold, (i) an external fuel exit manifold, (j) an internal fuel turn manifold, and (k) an external fuel turn manifold;
a source of fuel;
a fuel storage device which receives fuel from said source:
said first fuel flow field in said series receiving fuel from said source; and
an additional fuel flow field in said series receiving fuel from (l) a fuel flow field next antecedent to said additional fuel flow field in said series and from either (m) said fuel storage device or (n) said source.

8. A fuel cell power plant, comprising:
a plurality of fuel cells having fuel flow channels arranged in a series of M fuel flow fields, the last fuel flow field in said series being the Mth fuel flow field in said series, and the first fuel flow field in said series being the (M−N)th flow field in said series, where N is one less than M, said series of fuel flow fields selected from (a) M fuel flow passes through the fuel flow channels of each cell, (b) the fuel flow fields of M groups of fuel cells in a serial fuel flow relationship within one cascaded fuel cell stack, In which the fuel is fed from each group but the last into the next group in the series, and (c) the fuel flow fields of M fuel cell stacks in serial fuel flow relationship in which fuel is fed from each stack but the last into the next stack in the series, each of said fuel flow fields connected between a fuel flow field inlet and a fuel flow field exit;
each of said fuel flow field inlets connected to a fuel manifold selected from (d) an internal fuel inlet manifold, (e) an external fuel inlet manifold, (f) an internal fuel turn manifold, and (g) an external fuel turn manifold;
each of said fuel flow field exits connected to a fuel manifold selected from (h) an internal fuel exit manifold, (i) an external fuel exit manifold, (j) an internal fuel turn manifold, and (k) an external fuel turn manifold;
a source of fuel;
said first flow field in said series receiving fuel from said source;

a fuel recycle loop receiving fuel from the one of said manifolds connected to the fuel flow field exit of said Mth one of said fuel flow fields and providing recycle fuel to either (l) a first one of said manifolds connected to the fuel flow field inlet of said Mth flow field in said series, or (m) a second one of said manifolds connected to the fuel flow field inlet of the (M−1th) flow field in said series, or (n) both said first and second manifolds;

said fuel recycle loop having as an impeller an ejector having its primary input connected to said fuel flow field exit of said (M−1th) flow field, its secondary input connected to said fuel flow field exit of said Mth flow field and having its output connected to one or both said first and second manifolds.

9. A fuel cell power plant, comprising:

a plurality of fuel cells having fuel flow channels arranged in a series of M fuel flow fields, the last fuel flow field in said series being the Mth fuel flow field in said series, and the first fuel flow field in said series being the (M−N)th flow field in said series, where N is one less than M, said series of fuel flow fields selected from (a) M fuel flow passes through the fuel flow channels of each cell, (b) the fuel flow fields of M groups of fuel cells in a serial fuel flow relationship within one cascaded fuel cell stack, in which the fuel is fed from each group but the last into the next group in the series, and (c) the fuel flow fields of M fuel cell stacks in serial fuel flow relationship in which fuel is fed from each stack but the last into the next stock in the series, each of said fuel flow fields connected between a fuel flow field inlet and a fuel flow field exit;

each of said fuel flow field inlets connected to a fuel manifold selected from (d) an internal fuel inlet manifold, (e) an external fuel inlet manifold, (f) an internal fuel turn manifold, and (g) an external fuel turn manifold;

each of said fuel flow field exits connected to a fuel manifold selected from (h) an internal fuel exit manifold, (i) an external fuel exit manifold, (j) an internal fuel turn manifold, and (k) an external fuel turn manifold;

a source of fuel;

said Mth flow field in said series receiving fuel (l) directly from said (M−1)th flow field and (m) from said source through a fuel storage device which receives fuel from said source.

* * * * *